United States Patent [19]
Wilson

[11] Patent Number: 5,883,443
[45] Date of Patent: Mar. 16, 1999

[54] COUNTERMEASURE METHOD AND SYSTEM FOR SECURING A REMOTE KEYLESS ENTRY SYSTEM

[75] Inventor: Mark M. Wilson, Pinckney, Mich.

[73] Assignee: UT Automotive Dearborn, Inc., Dearborn, Mich.

[21] Appl. No.: 884,576

[22] Filed: Jun. 27, 1997

[51] Int. Cl.$^6$ .................................................. B60R 25/04
[52] U.S. Cl. ..................... 307/10.2; 307/10.3; 307/10.4; 340/825.09; 340/825.72; 340/825.31; 180/287
[58] Field of Search .................................... 307/9.1, 10.1, 307/10.2, 10.3, 10.4, 10.5; 180/287; 340/425.5, 426, 825.3, 825.31, 825.32, 825.34, 825.54, 825.69, 825.72, 825.56; 701/2; 123/198 B; 70/51, 237, 256, 257; 380/23, 24, 25

[56] References Cited

U.S. PATENT DOCUMENTS

| | | | |
|---|---|---|---|
| 3,755,776 | 8/1973 | Kotras | 340/825.31 |
| 4,595,902 | 6/1986 | Proske et al. | 340/825.31 |
| 4,723,121 | 2/1988 | Van Den Boom et al. | 340/825.31 |
| 4,928,098 | 5/1990 | Dannhaeuser | 340/825.34 |
| 5,103,221 | 4/1992 | Memmola | 340/825.31 |
| 5,382,948 | 1/1995 | Richmond | 307/10.2 |
| 5,469,152 | 11/1995 | Yamamoto et al. | 340/825.69 |
| 5,523,746 | 6/1996 | Gallagher | 340/825.54 |
| 5,594,429 | 1/1997 | Nakahara | 340/825.69 |
| 5,596,317 | 1/1997 | Brinkmeyer et al. | 340/825.31 |
| 5,598,476 | 1/1997 | LaBarre et al. | 340/825.31 |
| 5,602,535 | 2/1997 | Boyles et al. | 307/10.4 |
| 5,654,688 | 8/1997 | Allen et al. | 340/426 |
| 5,675,534 | 10/1997 | Hewitt et al. | 340/825.31 |
| 5,708,712 | 1/1998 | Brinkmeyer et al. | 340/825.34 |
| 5,723,911 | 3/1998 | Glehr | 307/10.2 |
| 5,734,330 | 3/1998 | Nakamura | 340/825.31 |
| 5,742,236 | 4/1998 | Cremers et al. | 307/10.5 |

*Primary Examiner*—Jeffrey Gaffin
*Assistant Examiner*—Peter Ganjian
*Attorney, Agent, or Firm*—Howard & Howard

[57] ABSTRACT

The present invention teaches a method for preventing the use of an unauthorized reproduction of a remote unlock signal. In this scenario, the unauthorized reproduction occurs by jamming the receiver from receiving the remote unlock signal while intercepting the remote unlock signal. Generally, the remote unlock signal is transmitted by a transmitter to the receiver within a vehicle having a lock, wherein the receiver initiates an unlock command in response to receiving the transmitted remote unlock signal, and the vehicle lock being mechanically actuated by a key or electronically initiated by the unlock command in a previous locking session. The method for preventing the use of an unauthorized reproduction of a remote unlock signal comprises the steps of sensing whether the vehicle lock is being mechanically actuated by the key in the previous locking session, generating a flag if the vehicle lock has been mechanically actuated by the key, and disabling the receiver from initiating the unlock command in response to receiving the remote unlock signal transmitted by the transmitter if the flag is generated.

14 Claims, 1 Drawing Sheet

COUNTERMEASURE METHOD AND SYSTEM FOR SECURING A REMOTE KEYLESS ENTRY SYSTEM

FIELD OF THE INVENTION

This invention relates to remote keyless entry ("RKE") systems, generally, and more particularly to a method and system for securing RKE systems.

BACKGROUND OF THE INVENTION

Remote keyless entry ("RKE") systems are well known in the automotive industry. Comprising a fob transmitter for transmitting a remote control signal and a receiver for receiving each remote control signal, remote keyless entry systems enable users to control several vehicle functions remotely, such as the door locks and trunk, for example. By this design, each remote control signal comprises a functional command which the receiver initiates once the validity of the signal is determined.

In providing remote control to vehicle functions, a problem arises as to restricting remote access to the automobile's owners and authorized users. As the remote control signals are transmitted over the air, interception is a substantial and growing possibility as a means of gaining unauthorized access to the vehicle.

One solution which has been incorporated to defeat the simple retransmission of remote control signals is rolling code encryption. Here, each remote control signal is shifted and changed such that simple playback of the last transmitted remote control signal does not initiate a vehicle function because the previous signal is dissimilar to the present signal.

There are however other limitations irrespective of using rolling code encryption. These drawbacks primarily focus on the potential for simultaneous jamming and interception of the transmitted remote control signal. In one scenario, a thief simultaneously jams the reception of the remote control signal while also intercepting the remote control signal as transmitted by an authorized user. The authorized user, at such time, assumes a malfunction in the RKE system and enters the vehicle using the traditional key. The thief, as a result, follows the authorized user until the vehicle is parked and retransmits the intercepted remote control signal.

Thus, industry requires a method and system for preventing an unauthorized user from reproducing a remote control signal to gain access to a vehicle.

SUMMARY OF THE INVENTION

The primary advantage of the present invention is to overcome the limitations of the prior art.

A further advantage of the present invention is to provide a method and system for preventing an unauthorized user from reproducing a remote control signal to gain access to a vehicle.

In order to achieve the advantages of the present invention, a method is disclosed for preventing the unauthorized reproduction of a remote unlock signal. In this scenario, the unauthorized reproduction occurs by jamming the receiver from receiving the remote unlock signal while intercepting the remote unlock signal. Generally, the remote unlock signal is transmitted by a transmitter to the receiver within a vehicle having a lock, wherein the receiver initiates an unlock command in response to receiving the transmitted remote unlock signal, and the vehicle lock being mechanically actuated by a key or electronically initiated by the unlock command in a previous unlocking session. The method for preventing the unauthorized reproduction of a remote unlock signal comprises the steps of sensing whether the vehicle lock has been mechanically actuated by the key in the previous unlocking session, generating a flag if the vehicle lock has been mechanically actuated by the key, and disabling the receiver from initiating the unlock command in response to receiving the remote unlock signal transmitted by the transmitter if the flag is generated.

In a further embodiment of the present invention, a system is disclosed for preventing the unauthorized reproduction of a remote unlock signal. In this scenario, the unauthorized reproduction occurs by jamming a receiver from receiving the remote unlock signal while intercepting the remote unlock signal. Generally, the remote unlock signal is transmitted by a transmitter to the receiver within a vehicle having a lock, wherein the receiver initiates an unlock command in response to receiving the transmitted remote unlock signal, and the vehicle lock is mechanically actuated by a key or electronically initiated by the unlock command in a previous unlocking session. The system for preventing the unauthorized reproduction of a remote unlock signal comprises a sensor for sensing whether the vehicle lock is being mechanically actuated by the key in the previous unlocking session. Moreover, the system comprises a processor for generating a flag if the vehicle lock has been mechanically actuated by the key, and for disabling the receiver from initiating the unlock command in response to receiving the remote unlock signal transmitted by the transmitter if the flag is generated.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENT

Figure 1:
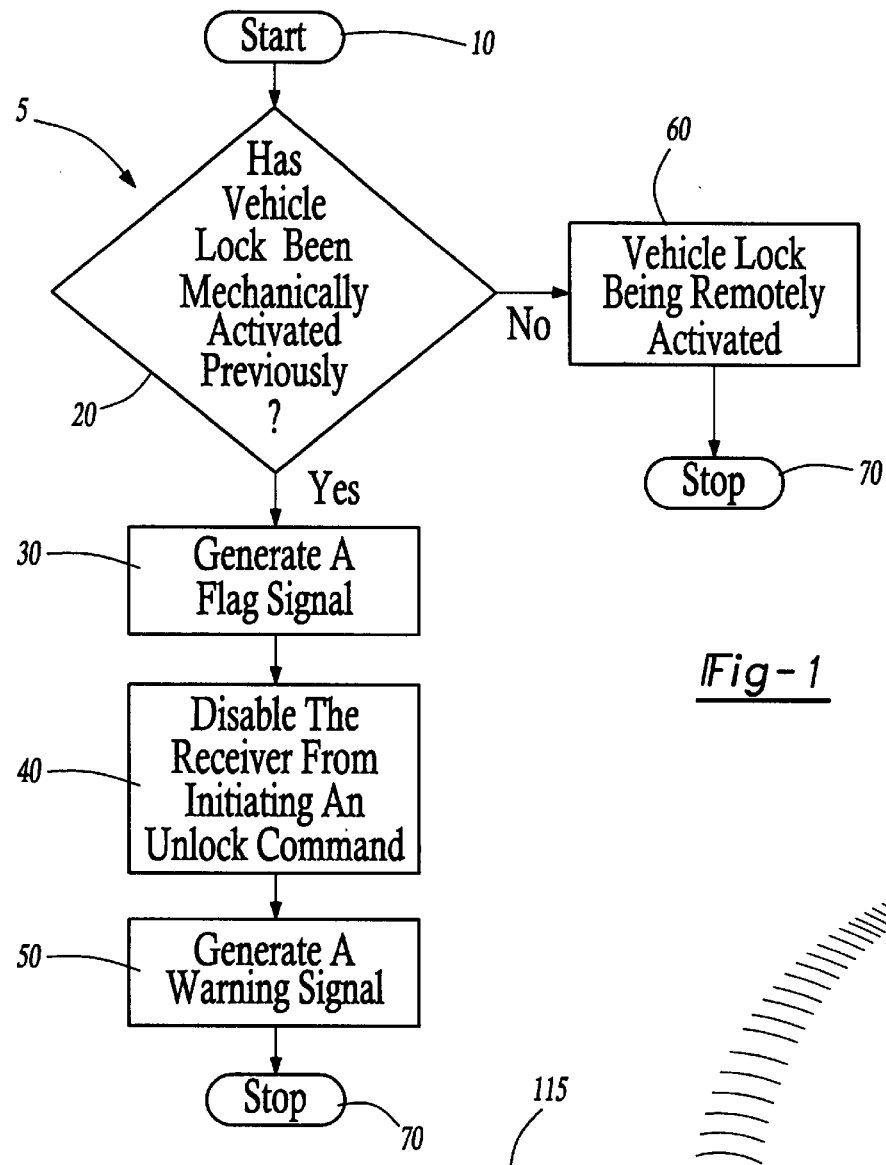
FIG. 1 illustrates a flow chart depicting a method for preventing the unauthorized reproduction of a remote unlock signal according to the present invention.

Referring to FIG. 1, a flow chart 5 is shown depicting a method for preventing the unauthorized reproduction of a remote unlock signal. Flow chart 5 addresses the scenario whereby a remote keyless entry receiver is jammed, by a jamming device, from receiving a remote unlock signal as transmitted by a fob transmitter. The jamming device, also known as a code grabber, also intercepts the remote unlock signal. In so doing, the authorized user cannot remotely actuate the door lock mechanism. However, the jammed and intercepted remote unlock signal may be replayed subsequently to gain access to the vehicle.

To prevent the jammed and intercepted remote unlock signal from providing unauthorized access to the vehicle, the method according to the present invention is first initiated (START 10). Thereafter, the method comprises the step of determining whether the vehicle lock has been mechanically actuated in previous unlocking session (STEP 20). In the event the user transmits a correct remote unlock signal, the method enables the vehicle lock to be remotely actuated (STEP 60) and the method subsequently terminates (STOP 70).

However, on the other hand, if it is determined that the vehicle lock was mechanically actuated (STEP 20) in the previous session, a flag is generated (STEP 30). Once the flag is generated, the receiver is disabled from initiating an unlock command (STEP 40) in response to remote unlock signals for a number of unlocking sessions. In the preferred embodiment, the receiver is disabled from initiating an unlock command in response to a remote unlock signal for one unlock session.

In an alternate embodiment of the present invention, a warning signal is generated (STEP 50) upon the receiver being disabled from initiating an unlock command (STEP 40). The warning signal may be employed to trigger (1) a car alarm 200; (2) the blowing of the horn 202; and (3) flashing of the lights 204 to inform the authorized user of an attempt at unauthorized access. Moreover, the generation of the warning signal may further trigger the receiver to re-transmit the warning signal to the original fob transmitter also to notify the authorized user of an attempt at unauthorized access. In still a further embodiment, the warning signal further triggers an onboard camera 206 to record images in an attempt to secure the identity of the perpetrator of the unauthorized retransmission of the remote unlock signal. Upon generating the warning signal, the method is completed (STOP 70).

In the preferred embodiment of the present invention, the remote unlock signal comprises an encrypted rolling code format. It should be noted that in an alternate embodiment of the present invention, the remote unlock signal is encrypted utilizing either a linear or non-linear rolling code scheme.

Figure 2:
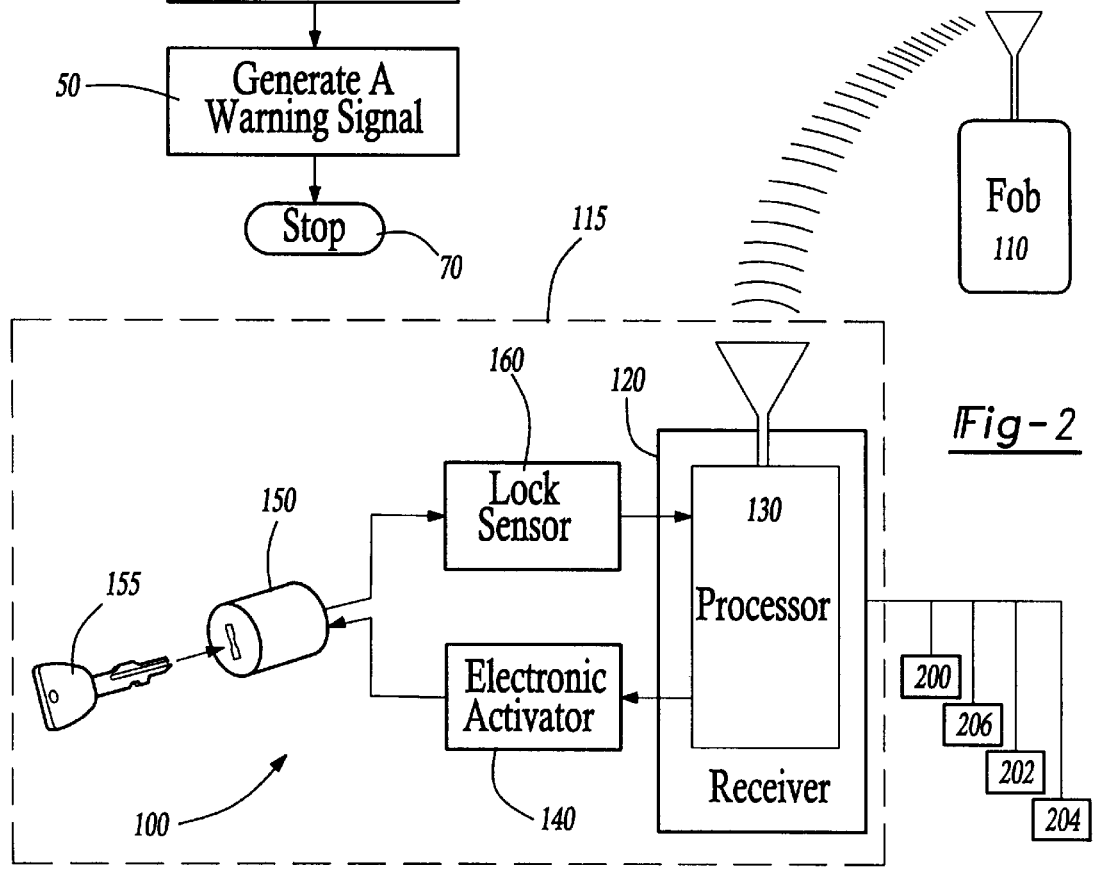
FIG. 2 illustrates a system for preventing the unauthorized reproduction of a remote unlock signal according to the present invention.

Referring to FIG. 2, a system 100 for preventing the unauthorized reproduction of a remote unlock signal is depicted. System 100 comprises a fob transmitter 110 and countermeasure system 115. Fob transmitter 110 functionally transmits a remote unlock signal to receiver 115 in response to a user actuating a transmit unlock switch (not shown).

Countermeasure system 115 addresses the problem whereby a remote keyless entry receiver 120 is jammed, by a jamming device, from receiving the remote unlock signal as transmitted by fob transmitter 110. Here, the jamming device, also known as a code grabber, also intercepts the remote unlock signal from the fob transmitter 110 such that the authorized user cannot remotely actuate a door lock mechanism. In this scenario, the jammed and intercepted remote unlock signal may be replayed subsequently to gain access to the vehicle.

To circumvent this problem, countermeasure system 115 comprises a lock sensor 160 for sensing whether a vehicle lock 150 has been mechanically actuated by a key 155 in the previous unlocking session. If the actuation of vehicle lock 150, in previous unlocking session, was initiated electronically by means of the transmission and reception of a proper remote unlock signal, an unlock command initiates unlocking the vehicle lock.

However, if in previous unlocking session, vehicle lock 150 was mechanically actuated with key 155, lock sensor 160 transmits a lock sensor signal to a processor 130 preferably located within receiver 120. In response to receiving the lock sensor signal, processor 130 generates a flag preferably stored within the routine memory of processor 130. As a result of creating the flag, receiver 120, through processor 130, is disabled from generating an unlock command to initiate electronic actuator 140 and remotely unlock vehicle lock 150 in response to the next transmission of a correct remote unlock signal. In a further embodiment of the present invention, receiver 120 is disabled from generating an unlock command to initiate electronic actuator 140 in response to a predetermined numbers transmissions of a correct remote unlock signals for a predetermined number of sessions as controlled by the user.

In a further embodiment, processor 130 also generates a warning signal if the receiver is disabled and the flag is generated. In so doing, the warning signal may be employed to trigger (1) a car alarm; (2) the blowing of the horn; and (3) flashing of the lights to inform the authorized user of attempt at unauthorized access. Moreover, the generation of the warning signal may further trigger the receiver to retransmit the warning signal to the original fob transmitter also to notify the authorized user of an attempt at unauthorized access. In still a further embodiment, the warning signal further triggers an onboard camera to record images in an attempt to secure the identity of the perpetrator of the unauthorized retransmission of the remote unlock signal.

In the preferred embodiment of the present invention, the remote unlock signal comprises an encrypted rolling code format. It should be noted that in an alternate embodiment of the present invention, the remote unlock signal is encrypted utilizing either a linear or non-linear rolling code scheme.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, it should be apparent to one of ordinary skill in the art that while the present invention details an unlock command for a remote keyless entry system, the method and system may be employed to circumvent the jamming and interception of other command signals. Moreover, the present invention may be employed in other applications where the signal transmitted may be jammed and intercepted by an unauthorized user as are apparent to one of ordinary skill in the art upon reviewing the details of the present invention. It is therefore contemplated that the appended claims will cover any such modifications or embodiments as they fall within the true scope of the invention.

What is claimed is:

1. A method for preventing access to a vehicle using an unauthorized reproduction of a remote unlock signal that is transmitted by a transmitter to a receiver supported by the vehicle having a lock, the receiver initiating an unlock command in response to receiving the transmitted remote unlock signal, the vehicle lock being mechanically actuated by a key or electronically initiated by the unlock command in a previous unlocking session, the method comprising the steps of:

sensing whether the vehicle lock has been mechanically actuated by the key in the previous unlocking session;

generating a flag if the vehicle lock has been mechanically actuated by the key in the previous unlocking session; and disabling the receiver from initiating the unlock command in response to receiving the remote unlock signal transmitted by the transmitter if said flag is generated.

2. The method of claim 1, further comprising the steps of:

generating a warning signal if the receiver is disabled and said flag is generated.

3. The method of claim 2, wherein said warning signal comprises at least one of blowing a horn, triggering an alarm, flashing of lights, and initiating a camera for recording images.

4. The system of claim 2, further comprising the step of:

transmitting said warning signal to the transmitter.

5. The method of claim 1, wherein the receiver is disabled from initiating the unlock command in a subsequent unlocking session, in response to a further remote unlock signal transmitted by the transmitter of said flag is generated.

6. A method for preventing access to a vehicle using an unauthorized reproduction of a first encrypted rolling code signal from a set of encrypted rolling code signals comprising a function unlock code and being transmitted by a remote transmitter to a receiver supported on the vehicle having a lock mechanically actuated by a key or electronically initiated by an unlock command in a previous unlocking session, the receiver initiating the unlock command in response to receiving the function unlock code, the method comprising the steps of:

sensing whether the vehicle lock has been mechanically actuated by the key in the previous unlocking session;

setting a first flag if the vehicle lock has been opened mechanically in the previous unlocking session in response to said sensing step;

disabling the receiver from initiating the unlock command in response to the first encrypted rolling code signal being retransmitted if said first flag is generated; and generating a warning signal if the receiver is disabled and said first flag is generated.

7. The method of claim 6, wherein said warning signal comprises at least one of blowing a horn, triggering an alarm, flashing of lights, and initiating a camera for recording images.

8. The system of claim 6, further comprising the step of:

transmitting said warning signal to the transmitter.

9. The method of claim 6, further comprising the step of:

disabling the receiver from initiating the unlock command, in a subsequent unlocking session, in response to a subsequent encrypted rolling code signal transmitted by the transmitter if said first flag is generated.

10. A system for preventing access to a vehicle using an unauthorized reproduction of a remote unlock signal that is transmitted by a transmitter to a receiver supported by the vehicle having a lock, the receiver initiating an unlock command in response to receiving the transmitted remote unlock signal, the vehicle lock being mechanically actuated by a key or electronically initiated by the unlock command in a previous unlocking session, the system comprising:

a sensor for determining whether the vehicle lock has been mechanically actuated by the key in the previous unlocking session; and a processor for generating a flag if the vehicle lock has been mechanically actuated by the key in the previous unlocking session, and for disabling the receiver from initiating the unlock command in response to receiving the remote unlock signal transmitted by the transmitter if said flag is generated.

11. The system of claim 10, where said processor generates a warning signal if the receiver is disabled and said flag is generated.

12. The system of claim 11, wherein said warning signal comprises at least one of blowing a horn, triggering an alarm, flashing of lights, and initiating a camera for recording images.

13. The system of claim 11, wherein said warning signal is transmitted by the receiver to the transmitter.

14. The system of claim 10, wherein said processor disables the receiver from initiating the unlock command, in a subsequent unlocking session, in response to a further remote unlock signal transmitted by the transmitter if said flag is generated.

* * * * *